United States Patent
Erbert et al.

(10) Patent No.: US 6,739,728 B2
(45) Date of Patent: May 25, 2004

(54) SHORT PULSE LASER STRETCHER-COMPRESSOR USING A SINGLE COMMON REFLECTIVE GRATING

(75) Inventors: Gaylen V. Erbert, Livermore, CA (US); Subrat Biswal, Laurel, MD (US); Joseph M. Bartolick, Livermore, CA (US); Brent C. Stuart, Livermore, CA (US); Steve Telford, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 64 days.

(21) Appl. No.: 10/117,744

(22) Filed: Apr. 8, 2002

(65) Prior Publication Data

US 2003/0189756 A1 Oct. 9, 2003

(51) Int. Cl.[7] .............................. G02B 27/44; H01S 3/10
(52) U.S. Cl. ........................ 359/615; 359/333; 359/900; 372/25
(58) Field of Search ............................. 372/25; 359/900

(56) References Cited

U.S. PATENT DOCUMENTS

| | | | |
|---|---|---|---|
| 5,329,398 A | | 7/1994 | Lai et al. |
| 5,349,591 A | | 9/1994 | Weston et al. |
| 5,499,134 A | * | 3/1996 | Galvanauskas et al. ..... 359/333 |
| 5,572,355 A | * | 11/1996 | Cotton et al. ............... 359/333 |
| 5,847,863 A | | 12/1998 | Galvanauskas et al. |
| 5,867,304 A | | 2/1999 | Galvanauskas et al. |
| 5,907,436 A | | 5/1999 | Perry et al. |
| 5,960,016 A | | 9/1999 | Perry et al. |
| 6,081,543 A | | 6/2000 | Liu et al. |
| 6,198,568 B1 | | 3/2001 | Galvanauskas et al. |

OTHER PUBLICATIONS

G. Cheriaux, et al., "Aberration–free stretcher design for ultrashort–pulse amplification", Optics Letters, vol. 21, No. 6, pp. 414–416, Mar. 15, 1996.*

D. Du, et al., "Terawatt Ti:sapphire laser with a spherical reflective–optic pulse expander", Optics Letters, vol. 20, No. 20, pp. 2114–2116, Oct. 15, 1995.*

* cited by examiner

Primary Examiner—John Juba, Jr.
(74) Attorney, Agent, or Firm—Michael C. Staggs; Alan H. Thompson

(57) ABSTRACT

The present invention provides an easily aligned, all-reflective, aberration-free pulse stretcher-compressor in a compact geometry. The stretcher-compressor device is a reflective multi-layer dielectric that can be utilized for high power chirped-pulse amplification material processing applications. A reflective grating element of the device is constructed: 1) to receive a beam for stretching of laser pulses in a beam stretcher beam path and 2) to also receive stretched amplified pulses to be compressed in a compressor beam path through the same (i.e., common) reflective multilayer dielectric diffraction grating. The stretched and compressed pulses are interleaved about the grating element to provide the desired number of passes in each respective beam path in order to achieve the desired results.

43 Claims, 3 Drawing Sheets

SHORT PULSE LASER STRETCHER-COMPRESSOR USING A SINGLE COMMON REFLECTIVE GRATING

The United States Government has rights in this invention pursuant to Contract No. W-7405-ENG-48 between the United States Department of Energy and the University of California for the operation of Lawrence Livermore National Laboratory.

BACKGROUND OF THE INVENTION

In the design of short pulse laser systems (<2 ps), amplification using the technique of chirped pulse amplification (CPA) has become commonplace. This technique allows high energy, short pulses to be made possible by first stretching the pulse in time, amplifying it, and then recompressing it temporally. In these CPA laser systems, it is required to stretch ultrashort-pulses (or pulses having sufficient bandwidth to become ultrashort) prior to amplification. An ultrashort pulse is one having a duration in the range of 5 femtoseconds to 50 picoseconds.

The ultrashort pulse is stretched to a duration typically greater than 100 picoseconds prior to amplification by the system. Following the stretcher phase, the stretched, amplified, high energy pulse is recompressed to optimally its original temporal length. Such systems typically comprise a reflective system using a high precision grating.

Early designs typically have included at least a pair of diffraction gratings, the first for stretching the ultrashort pulse prior to injection into the laser system, and the second for recompression of the high energy pulse. This leads to costly and complex systems using gratings of the same design because multiple grating stretcher-compressors require precise alignment when a change in laser wavelength is required. In addition, matched grating pairs are required for the stretcher and compressor in order to maintain spatial uniformity and to obtain the appropriate pulse duration.

There is a continuing need for improvements in generating high-energy ultrashort pulses. There is also a need to simplify present systems by making them more compact, cost efficient and less burdensome in alignment sensitivity.

SUMMARY OF THE INVENTION

Accordingly, the present invention provides a compact, inexpensive, single common all-reflective stretcher and compressor device for chirped-pulse amplification.

The stretcher in the present all-reflective system comprises optical components that allow the entering beam to strike the all-reflective grating at different vertical displacements during the stretcher path. For example, the entering beam strikes the grating and is diffracted to a reflective focusing optic that reflects the beam to a flat reflective optic at the focal plane of the reflective focusing optic. The beam is then reflected back to the focusing element that will reflect the beam to a vertically displaced position on the reflective grating. The beam is then diffracted to a retro-reflective device such as a roof mirror that again returns the beam to a vertically displaced position of the grating. The beam undergoes additional passes to stretch the beam and exits the stretcher and is amplified before entering the compressor path of the present invention.

The compressor in the present all-reflective system utilizes the same reflective grating element that is used for the stretcher. The amplified beam enters and strikes the grating and is diffracted to a retro-reflective set of optical components that allows translation along the beam path direction to enable compression adjustment of the amplified stretched pulse. The beam is then reflected back to a displaced vertical position on the reflective grating and is interleaved about positions that were used for initial compression of the pulse but is overlapped at those sites on the grating used for pulse stretching. This beam is diffracted to a retro-reflective device such as a roof mirror that again reflects the beam to the reflective grating at a vertically displaced position. The optical path then reverses itself and exits the system as a compressed amplified pulse.

Further aspects of the invention include methods for stretching an ultrashort pulse and compressing an amplified stretched pulse to its former pulse-width by utilizing components that allow overlapping on a common area on a single common reflective diffraction grating.

The present invention provides a cost effective compact system which combines the functionality of a stretcher and compressor employing a single high precision reflective optical grating. The system is an easily aligned, all-reflective, chirped pulse amplification device that can be utilized in commercial systems that need high power for material processing applications.

These features, variations, and other advantages of the present invention will become apparent from the following detailed description, claims and drawings.

DETAILED DESCRIPTION OF THE INVENTION

Figure 1:
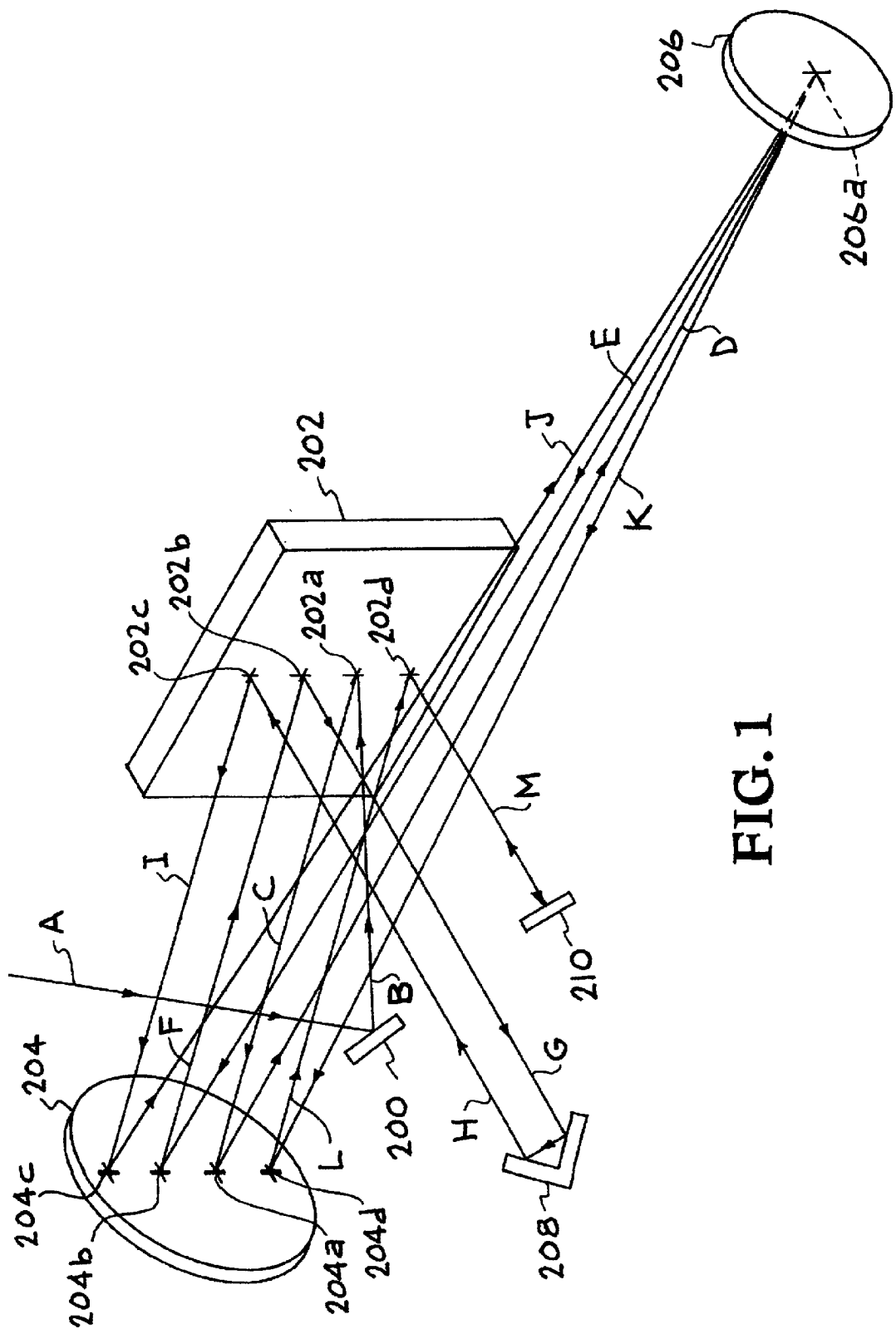
FIG. 1 is an optical schematic of the stretcher beam path of the present invention.

The present invention is an easily aligned, all-reflective, on-axis, aberration-free pulse stretcher-compressor with a minimum number of elements in a compact geometry. The present invention is typically an integral part of a laser system where desired power levels with necessary pulse-widths to perform high precision machining, (e.g., holes or cuts in metals, alloys, ceramics, and crystals with clearly differentiated sides and edges) is required.

In the prior art, stretchers and compressors are typically separate optical devices located at different points in the laser system. Each optical device may use two gratings for a total of four gratings for the entire system. In addition, prior art stretcher-compressors routinely use transmissive optics in some part of the beam path, (i.e., the stretcher beam path or the compressor beam path). In stretcher-compressors systems of the prior art where the optical dispersive element (i.e., the grating), is all-reflective, the input beam to a stretcher and a compressor system enter from the same side of the normal to the grating. Thus, overlapping of the beams is not possible in the prior art all-reflective systems and vertical displacements are necessary. Accordingly, prior art systems typically use different sections of single stretcher-compressor diffraction gratings, which then requires a much larger stretcher-compressor device than the present invention.

A stretcher-compressor device employed in the present invention, i.e., the common reflective diffraction grating, the structure and method of preparation thereof is disclosed in U.S. Pat. No. 5,907,436, the disclosure is herein incorporated by reference in its entirety. The common reflective diffraction grating of the present invention is a relatively large in dimension device, (between about 100 mm×200 mm and about 500 mm×1000 mm), that is more compact in design than other related stretcher-compressor devices because the stretched and compressed pulses of the system can share a common area on the device. The combination of the stretcher and compressor beam paths make two or more reflective passes from the grating (e.g., 12 reflections), and are interleaved along the aforementioned common area. The stretcher-compressor device, when acting as a stretcher, disperses the various frequency components that comprise each pulse from a laser source along widely varying paths through preferably all reflective optics although at least one transmissive optic may be used, and reassembles them into a well-collimated beam in the stretcher beam path. The stretcher-compressor device, when acting as a compressor, again disperses the various frequency components from each pulse from a laser source and then recompresses the various frequency components temporally into another well-collimated beam in the compressor beam path. This concept combines the functionality of the stretcher and compressor into a single reflective system using a single common grating. It minimizes costs and alignment problems by using a single grating.

The common area on the stretcher-compressor device of the present invention is achieved because stretching of the pulses from the laser source and compressing of the laser source pulses after stretched amplification are incident on the grating from opposite but equal angles with respect to the normal to the grating. A second technique for beam overlapping which is particularly useful is to input the pulses for stretching and compressing into the stretcher-compressor device at unequal angles from the normal to the grating and then adjust the complimentary optical components in the compressor beam path (i.e., adjust the compressor beam path length), to match the stretcher beam path for recompression of the pulse to its original length. Thus, the present invention allows a common area on the grating to be shared by the stretched and compressed laser pulses. The input angle is chosen to be within plus or minus ten degrees from the Littrow angle, with a preferred range between about 66 and about 70 degrees, and a highly preferred angle of about 68 degrees from the normal to the grating for the grating selected and for the wavelength range with which the grating is used. Thus, the input angle for the stretcher path and the input angle for the compressor oath can be between about 58 degrees and about 78 degrees from a normal to said grating.

The pulse stretcher section of the present invention is shown in FIG. 1. The components of the system, for example, are an input flat turning mirror 200 such as for example, a 1" diameter mirror, a relatively large (e.g., from about 100 mm×200 mm to about 500 mm×1000 mm), common reflective diffraction (e.g., 1800 grooves/mm) multilayer dielectric grating 202, a flat mirror 206 such as for example, a 4" diameter mirror at the focal plane of a curved mirror 204, typically 6" in diameter, a roof mirror 208 that displaces the beam vertically for additional passes through the stretcher, and a retro-reflecting mirror 210 such as for example, a 1" diameter mirror. The flat mirror 206 is positioned at the focal plane of the curved mirror 204, thereby forming a unit magnification telescope upon retro-reflection.

In the method of the invention, referring to FIG. 1, ultra-short pulse beam A is received by the flat mirror 200, which directs the ultra-short beam along beam path B to the reflective dielectric grating 202d and is diffracted along beam path C to a curved spherical mirror 204a. The curved mirror 204 reflects a spatially dispersed beam along beam path D at a slight upward angle so that it strikes the flat mirror 206a at the focus of curved mirror 204. The spatially dispersed beam is reflected along beam path E from the flat mirror 206, back to the curved mirror 204b, which directs the beam along beam path F to an interleaved position on the reflective dielectric grating 202b. The reflective dielectric grating 202 diffracts and directs the beam to a gold roof mirror 208 along beam path G that displaces the beam vertically and redirects the beam along beam path H back to an interleaved position on the dielectric grating 202c. The reflective dielectric grating 202 diffracts the beam along beam path I to the curved spherical mirror 204c. The curved mirror 204 reflects the beam along beam path J at a slight downward angle so that it strikes the flat mirror 206a at the focus of curved mirror 204. The beam is reflected along beam path K from the flat mirror 206 back to the curved mirror 204d, which directs the beam along beam path L to the reflective dielectric grating 202d. The reflective dielectric grating 202 then diffracts the beam along beam path M to the flat retro-reflecting mirror 210. Reflection from the flat retro-reflecting mirror 210 repeats this sequence in reverse order, resulting in a stretched pulse to be received for amplification by a system.

Figure 2:
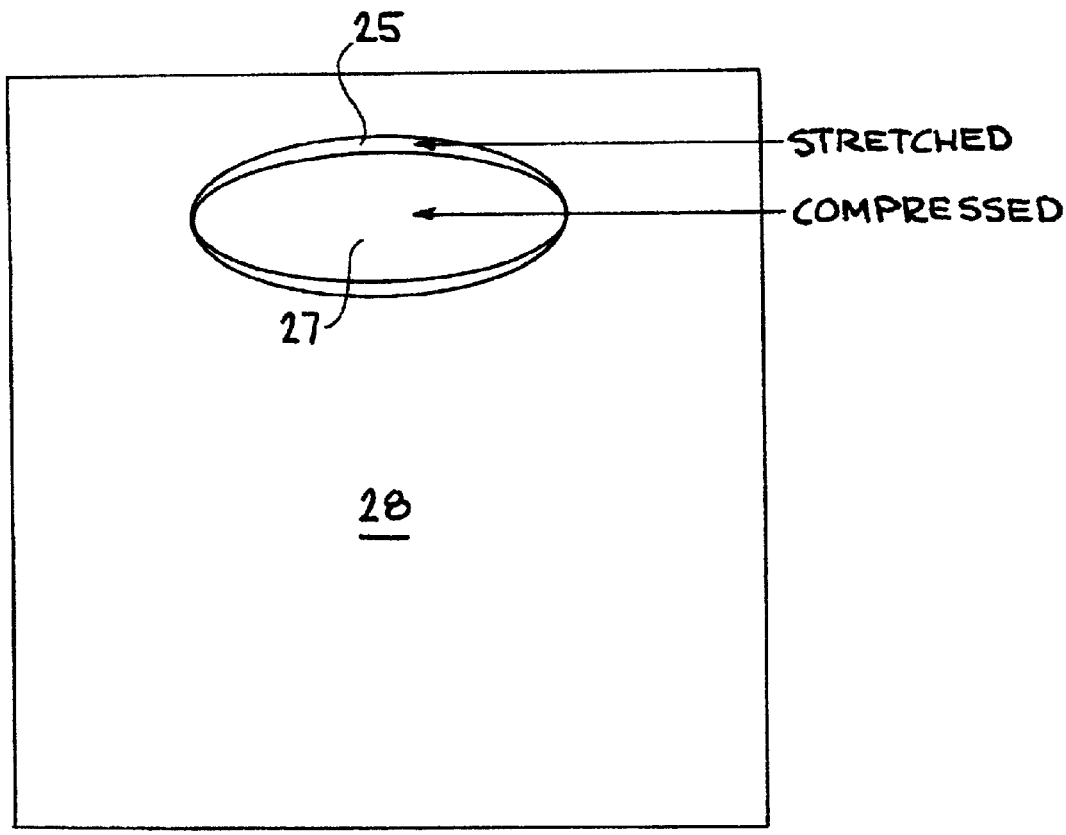
FIG. 2 is a representation of the overlapping of the stretched and compressed pulses of the stretcher-compressor.

The stretched beam 202c, is shown in an exploded view in FIG. 2 as a spatially spread beam 25 that is overlapped, (i.e., the shared common area), with a compressed beam 27 from the compressor beam path on the dielectric diffraction grating 28.

Figure 3:
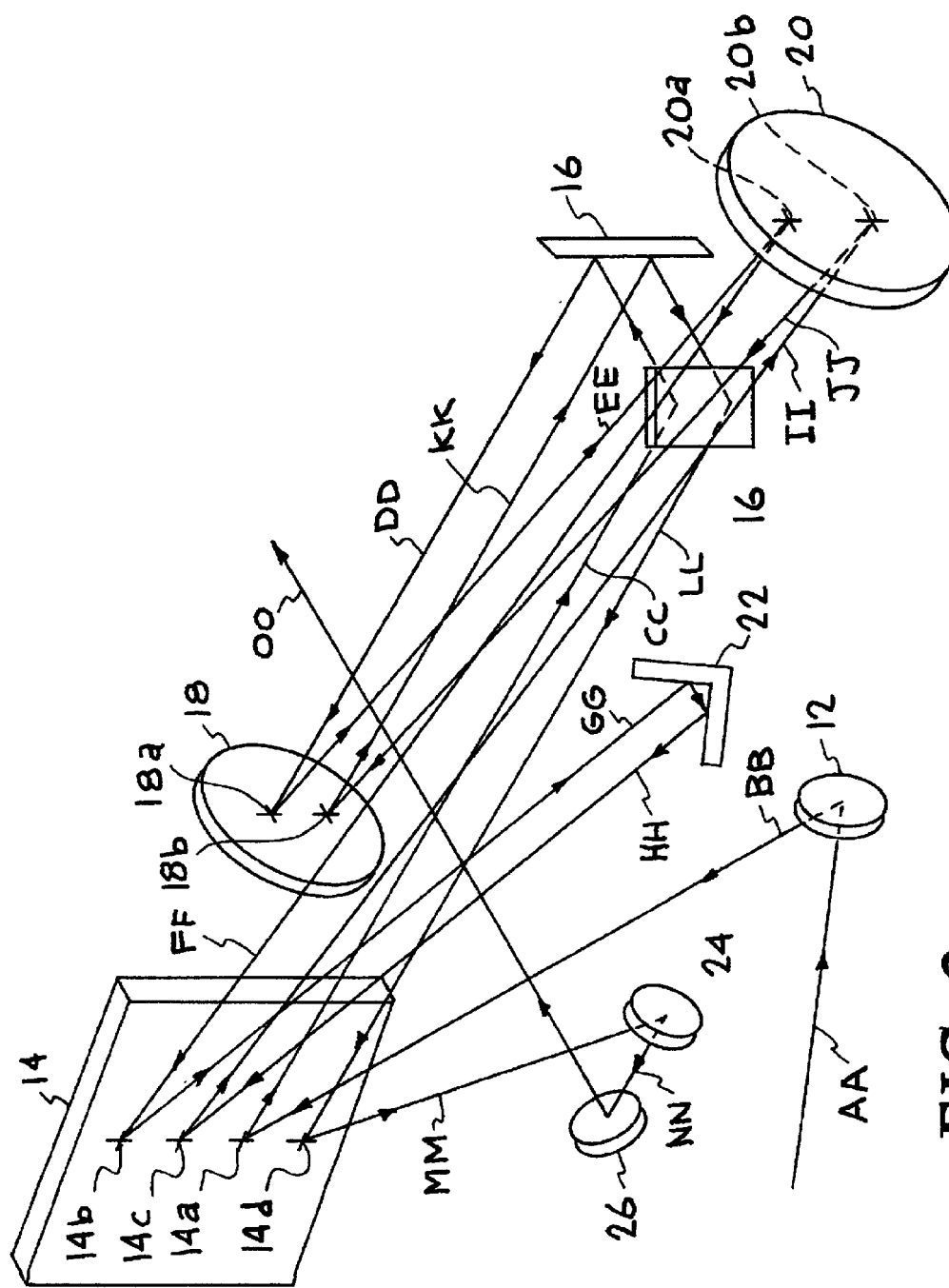
FIG. 3 is an optical schematic of the compressor beam path of the present invention.

The pulse compressor section of the present invention is shown in FIG. 3. The components of the system are, for example, an input flat turning mirror 12 such as for example a 2" diameter mirror, the common reflective multilayer dielectric grating 14, at least a pair of retro-reflecting mirrors 16 on a horizontal translation stage 16, at least a pair of flat mirrors 18, 20 typically 4" in diameter, a roof mirror 22, a pick-off mirror 24 such as for example a 2" diameter mirror, and a flat output turning mirror 26 such as for example a 2" diameter mirror.

In the method of the invention, referring to FIG. 3, the stretched amplified beam, e.g., stretched beam, AA is received by the flat mirror 12, which directs beam BB to the reflective dielectric grating 14a and beam CC is diffracted to the pair of retro-reflection mirrors 16 mounted on a horizontal translation stage. The stretcher and compressor must be perfectly matched to recompress the pulse to its original length. The pair of retro-reflection mirrors 16 mounted on a horizontal translation stage allows for this necessary distance adjustment to control the amount of negative group velocity dispersion (i.e., to control compression of the pulse). Thus, the adjustment of the pair of retro-reflection mirrors 16 mounted on a horizontal translation stage matches the compressor beam path length with the beam path length of the stretcher so that the minimum pulse width is generated. Beam DD is then directed from the pair of retro-reflection mirrors 16 to the first flat mirror 18a. Flat mirror 18 directs beam EE to a second flat mirror 20a which reflects beam FF back to an interleaved position on the dielectric grating 14b which then diffracts beam GG to the roof mirror 22. Roof mirror 22 displaces the beam vertically and directs beam HH back to an interleaved position on the dielectric grating 14c. Dielectric grating 14 diffracts beam II to flat mirror 20b that then reflects beam JJ to flat mirror 18b. Flat mirror 18 reflects beam KK to pair of mirrors 16 mounted on a horizontal stage that then directs beam LL to diffraction grating 14*d*. The dielectric diffraction grating 14 diffracts beam MM to a pick-off mirror 24 that directs beam NN to an out put turning mirror 26, resulting in a recompressed pulse that can be directed to a workpiece (not shown).

The compressed beam 14*b*, is shown in the exploded view in FIG. 2 as a spatially spread beam 27 that is overlapped, (i.e., the shared common area), with a stretched beam 25 from the stretcher beam path on the dielectric diffraction grating 28.

Changes and modifications in the specifically described embodiments can be carried out without departing from the scope of the invention, which is intended to be limited by the scope of the appended claims.

What is claimed is:

1. An apparatus, comprising:
   a single common reflective diffraction grating adapted for stretching a source of laser pulses in a stretcher beam path to produce one or more stretched laser pulses and adapted for producing one or more compressed laser pulses in a compressor beam path, wherein said stretched laser pulses and said compressed laser pulses are received at interleaved portions of a common area on said single common reflective diffraction grating.

2. The apparatus of claim 1 further comprising a focusing element in said stretcher beam path.

3. The apparatus of claim 1 wherein said focusing element is reflective.

4. The apparatus of claim 1 wherein said focusing element is transmissive.

5. The apparatus of claim 1 further comprising a mirror positioned at the focal plane of said focusing element, constructed to provide a desired number of passes in said stretcher beam path from said single common reflective diffraction grating.

6. The apparatus of claim 5 wherein said mirror positioned at the focal plane of said reflective focusing element is flat.

7. The apparatus of claim 5 wherein said mirror positioned at the focal plane of said reflective focusing element is curved.

8. The apparatus of claim 1 further comprising a retro-reflector mirror constructed to provide a desired number of passes in said stretcher beam path and said compressor beam path.

9. The apparatus of claim 1 wherein said laser pulses are received by said single common reflective diffraction grating in a first pass of said stretcher beam path at a first angle and wherein said stretched amplified laser pulses are received by said single common reflective diffraction in a first pass of said compressor beam path at a second angle equal and opposite to said first angle in said stretcher beam path.

10. The apparatus of claim 9 wherein said first angle for said stretcher beam path and said second angle for said compressor beam path are between about 58 degrees and about 78 degrees from a normal to said grating.

11. The apparatus of claim 1 wherein said laser pulses are received by said single common reflective diffraction grating in a first pass of said stretcher beam path at a first angle and wherein said stretched amplified laser pulses are received by said single common reflective diffraction in a first pass of said compressor beam path at a second angle unequal and opposite to said first angle in said stretcher beam path.

12. The apparatus of claim 11 wherein said first angle for said stretcher beam path and said second angle for said compressor beam path are between about 58 degrees and about 78 degrees from a normal to said grating.

13. The apparatus of claim 1 constructed to provide at least 2 passes from said single common reflective diffraction grating for stretching of said laser pulses and at least 2 passes from said single common reflective diffraction grating for compressing of said laser pulses.

14. The apparatus of claim 1, constructed to provide at least 8 passes from said single common reflective diffraction grating for stretching of said laser pulses and at least 4 passes from said single common reflective diffraction grating for compressing of said laser pulses.

15. The apparatus of claim 1 wherein said single common reflective diffraction grating further comprises a single common reflective diffraction grating that exhibits a diffraction efficiency greater than 90% at wavelengths from about 1022 nm to about 1088 nm.

16. The apparatus of claim 1 wherein said single common reflective diffraction grating comprises a dielectric.

17. The apparatus of claim 1 wherein said single common reflective diffraction grating is a single common reflective multi-layer dielectric diffraction grating having dimensions between about 100 mm×200 mm and about 500 mm×1000 mm.

18. An apparatus, comprising:
   a single common reflective diffraction grating adapted for stretching a source of laser pulses in a stretcher beam path to produce one or more stretched laser pulses and adapted for producing one or more compressed amplified laser pulses obtained from said one or more stretched amplified laser pulses in a compressor beam path received from an amplifier wherein said stretched laser pulses and said compressed amplified laser pulses are received at a common area on said single common reflective diffraction grating;
   a reflective focusing element constructed to provide a desired number of passes in said stretcher beam path from said single common reflective diffraction grating;
   a mirror positioned at the focal plane of said reflective focusing element, constructed to provide a desired number of passes in said stretcher beam path from said single common reflective diffraction grating;
   a first retro-reflector mirror constructed to provide a desired number of passes in said stretcher beam path wherein said first retro-reflector directs said laser pulses to interleaved portions of a common area on said single common reflective diffraction grating; and
   a second retro-reflective mirror constructed to receive said amplified stretched pulses and arranged to provide a desired number of passes in said compressor beam path wherein said amplified laser pulses are directed to said interleaved portions of said common area on said single common reflective diffraction grating.

19. The apparatus of claim 18 wherein said laser pulses are received by said single common reflective diffraction grating in a first pass of said stretcher beam path at a first angle and wherein said stretched amplified laser pulses are received by said single common reflective diffraction in a first pass of said compressor beam path at a second angle equal and opposite to said first angle in said stretcher beam path.

20. The apparatus of claim 19 wherein said first angle for said stretcher beam path and said second angle for said compressor beam path are between about 58 degrees and about 78 degrees from a normal to said grating.

21. The apparatus of claim 18 wherein said laser pulses are received by said single common reflective diffraction grating in a first pass of said stretcher beam path at a first angle and wherein said stretched amplified laser pulses are received by said single common reflective diffraction in a first pass of said compressor beam path at a second angle unequal and opposite to said first angle in said stretcher beam path.

22. The apparatus of claim 21 wherein said first angle for said stretcher beam path and said second angle for said compressor beam path are between about 58 degrees and about 78 degrees from a normal to said grating.

23. The apparatus of claim 18 wherein said reflective focusing element is a spherical mirror.

24. The apparatus of claim 18 wherein said mirror positioned at the focal plane of said reflective focusing element is flat.

25. The apparatus of claim 18, wherein said mirror positioned at the focal plane of said reflective focusing element is curved.

26. The apparatus of claim 18, constructed to provide at least 2 passes from said single common reflective diffraction grating for stretching of said laser pulses and at least 2 passes from said single common reflective diffraction grating for compressing of said laser pulses.

27. The apparatus of claim 18, constructed to provide at least 8 passes from said single common reflective diffraction grating for stretching of said laser pulses and at least 4 passes from said single common reflective diffraction grating for compressing of said laser pulses.

28. The apparatus of claim 18, wherein said single common reflective diffraction grating further comprises a single common reflective diffraction grating that exhibits a diffraction efficiency greater than 90% at wavelengths from about 1022 nm to about 1088 nm.

29. The apparatus of claim 18, wherein said single common reflective diffraction grating comprises a dielectric.

30. The apparatus of claim 18, wherein said single common reflective diffraction grating is a single common reflective multi-layer dielectric diffraction grating having dimensions between about 100 mm×200 mm and about 500 mm×1000 mm.

31. The apparatus of claim 18, wherein said first and second retro-reflective mirrors comprise flat mirrors.

32. The apparatus of claim 18 wherein said first retro-reflector mirror further comprises a flat mirror and a first roof mirror wherein said flat mirror and said first roof mirror are arranged to produce stretched laser pulses.

33. The apparatus of claim 32 wherein said source of laser pulses is firstly directed to said stretcher beam path.

34. The apparatus of claim 33 wherein said source of laser pulses initially strikes said single common reflective diffraction grating, secondly in the following first forward sequence diffracted to said reflective focusing element, thirdly said reflective focusing element reflects said laser pulses such that said pulses strike said mirror positioned at the focal plane of said reflective focusing element, fourthly said laser pulses are reflected from said mirror positioned at the focal plane of said reflective focusing element so that said pulses strike said reflective focusing element at a vertically displaced position on said reflective focusing element, fifthly said laser pulses are reflected from said reflective focusing element and directed to a vertically displaced position on said single common reflective diffraction grating, sixthly is diffracted by said single common reflective diffraction grating to said first roof mirror and repeats said forward sequence in the reverse order until, seventhly said source of laser pulses strikes said flat mirror and said entire forward sequence repeats in the reverse order to exit said stretcher beam path as temporally stretched laser pulses.

35. The apparatus of claim 18 wherein said second retro-reflector mirror further comprises a first pair of flat mirrors mounted on a horizontal translation stage, a second pair of positioned flat mirrors, and a second roof mirror wherein said second pair of flat mirrors, said second roof mirror, and wherein a horizontal translation of said first pair of mirrors is arranged to produce said compressed amplified laser pulses.

36. The apparatus of claim 35 wherein said source of laser pulses is secondly directed to said compressor beam path.

37. The apparatus of claim 36 wherein said stretched amplified laser pulses initially strikes said single common reflective diffraction grating, secondly said pulses are in the following second forward sequence, diffracted to said first pair of flat mirrors, thirdly said first pair of flat mirrors reflects said amplified laser pulses so as to strike said second pair of flat mirrors, fourthly said amplified laser pulses are reflected from said second pair of flat mirrors so that it strikes said single common reflective diffraction grating, fifthly said amplified laser pulses are diffracted to said second roof mirror, and said entire second forward sequence is conducted in the reverse order to exit said compressor beam path as temporally amplified compressed laser pulses.

38. A method of stretching an ultra-short pulse in a system comprising:

generating an ultra-short pulse;

directing said ultra-short pulse into said system to at least three interleaved portions of a common area on a single common reflective diffraction grating wherein said common area is capable of producing a stretched laser pulse or a compressed laser pulse;

stretching said ultra-short pulse by spatially dispersing said ultra-short pulse in a forward sequence by said single common reflective diffraction grating;

focusing said dispersed pulse to a line focus by a focusing element;

reflecting said dispersed pulse by a mirror positioned at the focal plane of said focusing element so as to strike said focusing element at a vertically displaced position such that said dispersed pulse diverges to produce a beam of minimal spherical aberration and to produce a beam size of unit magnification;

reflecting said dispersed laser pulse by said focusing element so as to strike said grating at a vertically displaced position;

further stretching said dispersed laser pulse by said single common reflective diffraction grating;

retro-reflecting said further stretched laser pulse to a vertically displaced position on said grating; and reversing said forward sequence in the reverse order wherein a desired number of passes is made so that a stretched laser pulse exits said system.

39. The method of claim 38 wherein said ultra-short pulse is directed to said single common diffraction grating in a stretcher beam path at a first angle equal and opposite to a second angle in a compressor beam path.

40. The method of claim 39 wherein said first angle for said stretcher beam path and said second angle for said compressor beam path are between about 58 degrees and about 78 degrees from a normal to said grating.

41. The method of claim 38 wherein said ultra-short pulse is directed to said single common diffraction grating in a stretcher beam path at a first angle unequal and opposite to a second angle in a compressor beam path.

42. The method of claim 41 wherein said first angle for said stretcher beam path and said second angle for said compressor beam path are between about 58 degrees and about 78 degrees from a normal to said grating.

43. A method of compressing an amplified laser pulse in a system comprising:

generating a stretched amplified laser pulse;

directing said stretched amplified laser pulse into said system to interleaved portions of a common area on a single common reflective diffraction grating wherein said interleaved common area is capable of producing a stretched laser pulse or a compressed laser pulse;

compressing said stretched amplified laser pulse by spatially dispersing said stretched amplified laser pulse on said single common diffraction grating in a forward sequence;

retro-reflecting said dispersed laser pulse wherein negatively chirped pulse compression is controlled by horizontal translation of a pair of flat mirrors;

further dispersing said laser pulse by said single common reflective diffraction grating; and reversing said forward sequence in the reverse order wherein a desired number of passes is made so that a compressed amplified laser pulse exits said system.

* * * * *